(12) United States Patent
Kwon

(10) Patent No.: US 12,267,792 B2
(45) Date of Patent: Apr. 1, 2025

(54) INTERFERENCE CANCELLATION REPEATER AND METHOD OF OPERATION THEREOF

(71) Applicant: SOLiD, INC., Seongnam-si (KR)

(72) Inventor: Nagwon Kwon, Seongnam-si (KR)

(73) Assignee: SOLID, INC., Seongnam-si (KR)

( * ) Notice: Subject to any disclaimer, the term of this patent is extended or adjusted under 35 U.S.C. 154(b) by 356 days.

(21) Appl. No.: 17/627,451

(22) PCT Filed: Aug. 10, 2020

(86) PCT No.: PCT/KR2020/010554
§ 371 (c)(1),
(2) Date: Jan. 14, 2022

(87) PCT Pub. No.: WO2021/029639
PCT Pub. Date: Feb. 18, 2021

(65) Prior Publication Data
US 2022/0264494 A1 Aug. 18, 2022

(30) Foreign Application Priority Data

Aug. 13, 2019 (KR) ......................... 10-2019-0099121
Aug. 7, 2020 (KR) ......................... 10-2020-0099508

(51) Int. Cl.
*H04L 5/14* (2006.01)
*H04W 56/00* (2009.01)

(52) U.S. Cl.
CPC ......... *H04W 56/001* (2013.01); *H04L 5/1461* (2013.01); *H04L 5/1469* (2013.01)

(58) Field of Classification Search
CPC ..... H04B 7/155; H04L 5/1469; H04L 5/1461; H04L 5/14; H04J 3/025; H04W 56/001
See application file for complete search history.

(56) References Cited

U.S. PATENT DOCUMENTS

| | | | |
|---|---|---|---|
| 2008/0225929 A1* | 9/2008 | Proctor | H04B 7/15585 375/233 |
| 2009/0207776 A1* | 8/2009 | Baik | H04B 7/15585 455/24 |
| 2013/0189921 A1 | 7/2013 | Maca | |
| 2014/0050253 A1* | 2/2014 | Jovanovic | H04L 27/2602 375/211 |
| 2014/0127989 A1 | 5/2014 | Judd et al. | |

(Continued)

FOREIGN PATENT DOCUMENTS

| | | |
|---|---|---|
| JP | 2008-532459 A | 8/2008 |
| JP | 2010-520718 A | 6/2010 |

(Continued)

OTHER PUBLICATIONS

International Search Report of PCT/KR2020/010554 dated Nov. 3, 2020 [PCT/ISA/210].

(Continued)

*Primary Examiner* — Anez C Ebrahim
(74) *Attorney, Agent, or Firm* — Sughrue Mion, PLLC

(57) ABSTRACT

Provided are an interference cancellation repeater capable of selecting one of a plurality of adaptive filters based on a synchronization signal and canceling interference included in a received signal using the selected adaptive filter and a method of operation thereof.

8 Claims, 5 Drawing Sheets

(56) References Cited

U.S. PATENT DOCUMENTS

| | | | |
|---|---|---|---|
| 2018/0041266 A1* | 2/2018 | Kwon | H04B 7/15585 |
| 2018/0054787 A1* | 2/2018 | Yanikomeroglu | H04J 11/0066 |
| 2018/0241109 A1* | 8/2018 | Ashworth | H04B 7/15535 |
| 2018/0269923 A1* | 9/2018 | Chang | H04B 1/525 |
| 2019/0190764 A1* | 6/2019 | Noh | H04L 5/18 |
| 2020/0367257 A1* | 11/2020 | Hormis | H04B 7/155 |
| 2020/0403689 A1* | 12/2020 | Rofougaran | H04W 52/245 |

FOREIGN PATENT DOCUMENTS

| | | | |
|---|---|---|---|
| JP | 2012-530446 A | 11/2012 | |
| KR | 10-0893051 B1 | 4/2009 | |
| KR | 10-1963518 B1 | 7/2019 | |

OTHER PUBLICATIONS

Japanese Office Action dated May 7, 2024 in Application No. 2022-505561.

\* cited by examiner

INTERFERENCE CANCELLATION REPEATER AND METHOD OF OPERATION THEREOF

CROSS REFERENCE TO RELATED APPLICATIONS

This application is a National Stage of International Application No. PCT/KR2020/010554 filed on Aug. 10, 2020, claiming priority based on Korean Patent Application No. 10-2019-0099121 filed on Aug. 13, 2019 and Korean Patent Application No. 10-2020-0099508 filed on Aug. 7, 2020.

TECHNICAL FIELD

Provided are an interference cancellation repeater capable of selecting one of a plurality of adaptive filters based on a synchronization signal and canceling interference included in a received signal using the selected adaptive filter and a method of operation thereof.

The present disclosure relates to an interference cancellation repeater and a method of operation thereof, and more particularly, to an interference cancellation repeater capable of selecting one of a plurality of adaptive filters based on a synchronization signal and canceling interference included in a received signal using the selected adaptive filter and a method of operation thereof.

The disclosure relates to results of implementation of "Development of high-power, high-efficiency, low-latency, and dual-mode (WiBro and TD-LTE) cell coverage extension device using a same frequency retransmission method using interference signal cancellation technology in TICN wireless networks (Civil-Military task number UM17408RD4)" of Institute of Civil-Military Technology Cooperation.

BACKGROUND ART

In a repeater that receives radio frequency (RF) signals and amplifies and transmits the received RF signals, when a sufficient separation distance between a donor antenna and a service antenna is not secured, due to a feedback signal in which a portion of a transmission signal from one antenna flows into the other antenna, reception performance may deteriorate or oscillation may occur.

An interference cancellation repeater, also called an interference cancellation system (ICS) or an on-channel repeater (OCR), may cancel and transmit a feedback signal component included in a received signal by using digital signal processing technology.

DISCLOSURE OF INVENTION

Technical Problem

Provided are an interference cancellation repeater capable of selecting one of a plurality of adaptive filters based on a synchronization signal and canceling interference included in a received signal using the selected adaptive filter and a method of operation thereof.

Solution to Problem

According to an aspect of an embodiment, a, method of operating an interference cancellation repeater may comprises detecting a synchronization signal from a received signal, selecting one of a plurality of adaptive filters based on the detected synchronization signal, and canceling interference included in the received signal by using the selected adaptive filter.

According to an aspect of an embodiment, the interference cancellation repeater may operate in a time division duplex (TDD) scheme.

According to an aspect of an embodiment, the method may comprise determining a downlink communication period or an uplink communication period based on the synchronization signal.

According to an aspect of an embodiment, the method may comprise selecting a first adaptive filter from among the plurality of adaptive filters in the uplink communication period and selecting a second adaptive filter from among the plurality of adaptive filters in the downlink communication period.

According to an aspect of an embodiment, the method may further comprise providing a first adaptive filter coefficient only to the first adaptive filter in the uplink communication period and providing a second adaptive filter coefficient only to the second adaptive filter in the downlink communication period.

According to an aspect of an embodiment, the first adaptive filter coefficient and the second adaptive filter coefficient may be coefficients having different values.

According to an aspect of an embodiment, the first adaptive filter coefficient may be set according to a feedback characteristic in the uplink communication period, and the second adaptive filter coefficient may be set according to a feedback characteristic in the downlink communication period.

According to an aspect of an embodiment, the method may further comprise providing an adaptive filter coefficient used in a communication period immediately before the guard period from among the first adaptive filter coefficient and the second adaptive filter coefficient, in the guard period.

According to an aspect of an embodiment, the method may comprise detecting a frame boundary in the received signal based on the detected synchronization signal and obtaining TDD pattern information from the received signal, and the selecting comprises selecting any one of the plurality of adaptive filters based on the frame boundary and the TDD pattern information.

According to an aspect of an embodiment, an interference cancellation repeater may comprise a synchronous detector configured to detect a synchronization signal from a received signal, a plurality of adaptive filters, each of which generates a predicted interference signal for canceling interference included in the received signal in an uplink communication period or a downlink communication period and a controller configured to generate a selection signal for selecting one of the plurality of adaptive filters based on the detected synchronization signal.

Effects of Invention

Method and apparatus according to an embodiment share most of a signal transmission path of uplink communication and a signal transmission path of downlink communication, but operate an adaptive filter separately, thereby performing an effective interference cancellation operation even for fast switching between uplink communication and downlink communication.

BRIEF DESCRIPTION OF DRAWINGS

Embodiments of the disclosure will be more clearly understood from the following detailed description taken in conjunction with the accompanying drawings in which.

DESCRIPTION OF EMBODIMENTS

Figure 1:
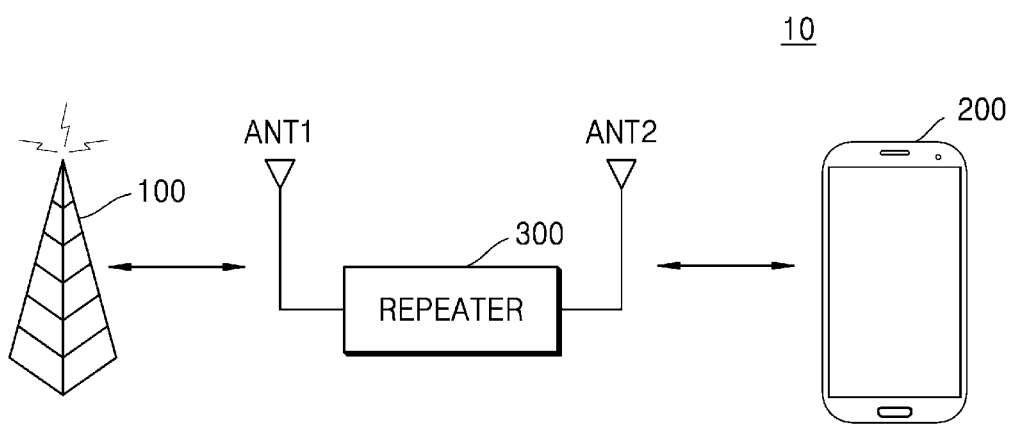
FIG. 1 is a conceptual diagram of a communication system according to an embodiment.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

FIG. 1 is a conceptual diagram of a communication system 10 according to an embodiment.

Referring to FIG. 1, the communication system 10 according to an embodiment may include a base station 100, a wireless communication terminal 200, and a repeater 300.

The wireless communication terminal 200 may be a device capable of performing wireless communication according to various mobile communication standards, and its shape may be variously modified.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network (non-stand alone (NSA) or stand alone (SA)), a 6G mobile communication network, or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

The first antenna ANT1 may be referred to as a donor antenna and the second antenna ANT2 may be referred to as a service antenna or a coverage antenna, but are not limited thereto.

According to an embodiment, the repeater 300 may be implemented as an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
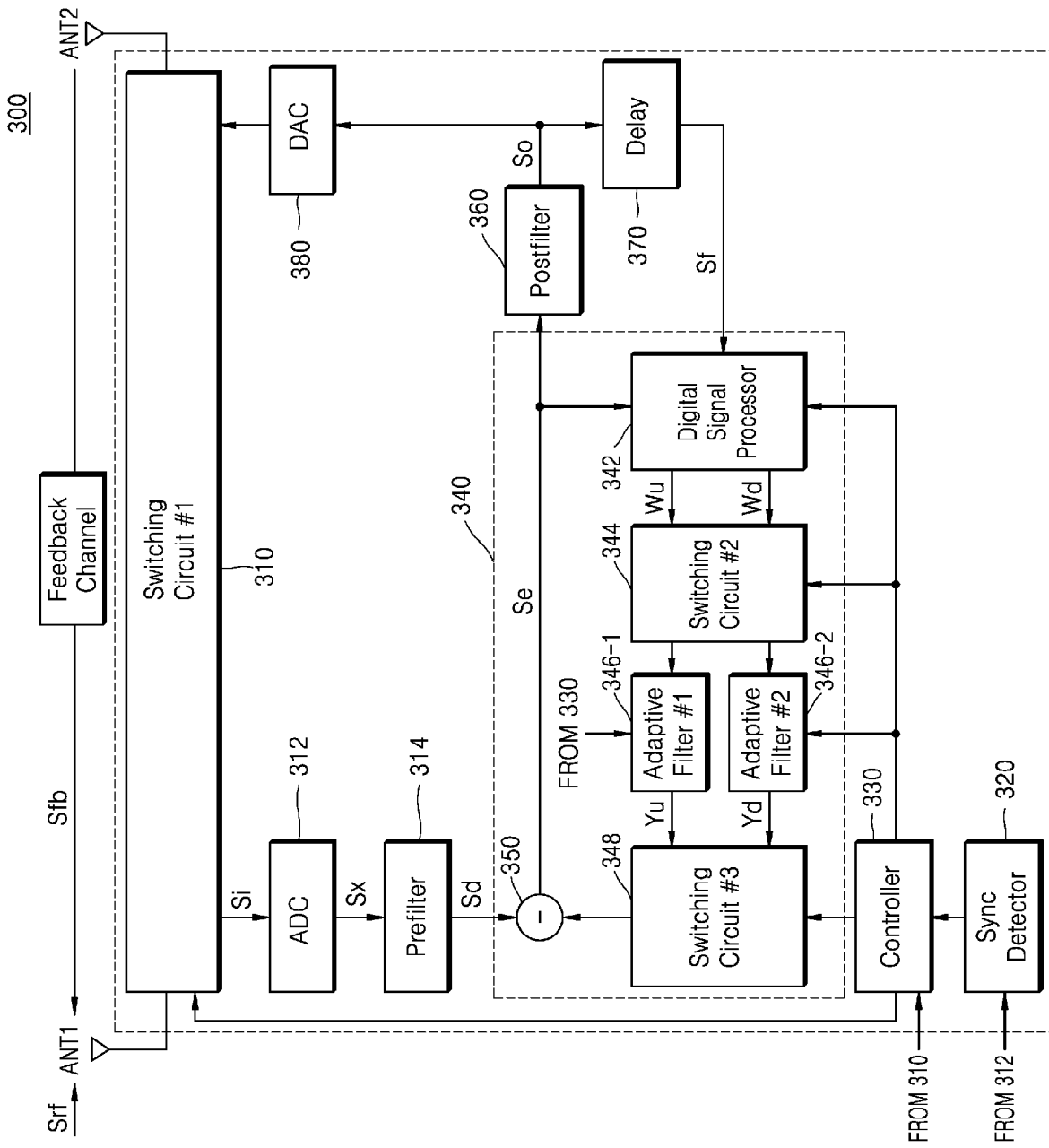
FIG. 2 is a block diagram of a repeater shown in FIG. 1, according to an embodiment.
Figure 3:
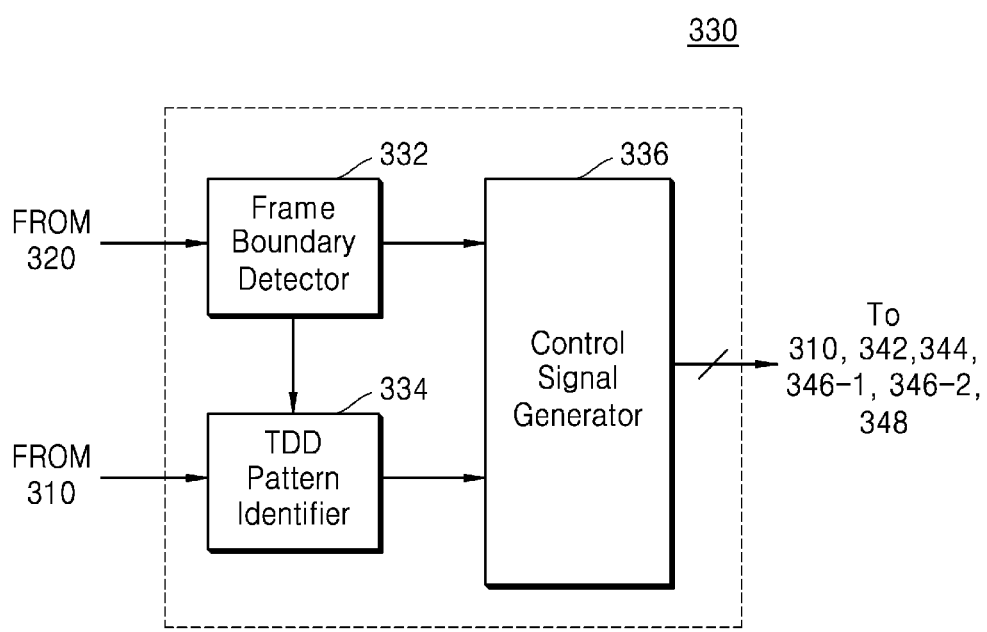
FIG. 3 is a block diagram of a controller in FIG. 2, according to an embodiment.
Figure 4:
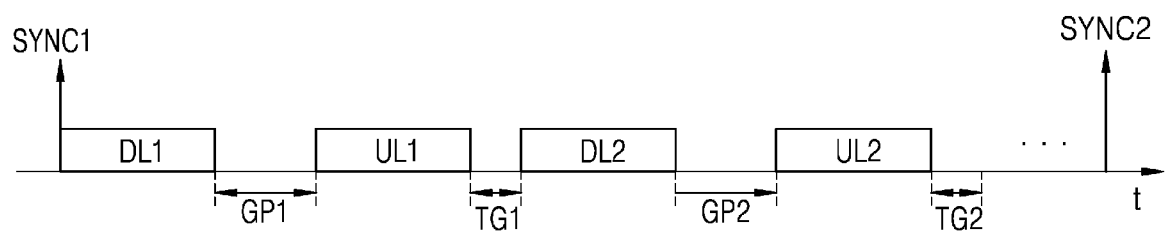
FIG. 4 is a view illustrating timing of uplink communication and downlink communication in a TDD-based interference cancellation repeater.

FIG. 2 is a block diagram of the repeater 300 shown in FIG. 1, according to an embodiment. FIG. 3 is a block diagram of a controller in FIG. 2, according to an embodiment. FIG. 4 is a view illustrating timing of uplink communication and downlink communication in a TDD-based interference cancellation repeater.

Referring to FIGS. 1 and 2, the repeater 300 may include a first antenna ANT1, a second antenna ANT2, a first switching circuit 310, an analog-to-digital converter 312, a prefilter 314, a synchronous detector 320, a controller 330, an interference cancellation part 340, a postfilter 360, a delay circuit 370, and a digital-to-analog converter 380.

The first antenna ANT1 may receive a wireless communication signal Srf (e.g., an RF signal) and a feedback signal Sfb output from the second antenna ANT2 and fed back through a feedback channel together.

In FIG. 2, downlink communication is illustrated as a reference, but uplink communication may operate in the same manner by changing only a path of a communication signal.

In addition, although FIG. 2 shows components on a path shared in uplink communication and downlink communication for convenience of explanation, the repeater 300 may further include separate components such as a low-noise amplifier (LNA) that does not share a path in uplink communication and downlink communication, a power amplifier (PA), and the like.

According to an embodiment, the repeater 300 may operate in a time division duplex (TDD) scheme.

The first switching circuit 310 may switch a communication path of a received signal inside the repeater 300 under the control of the controller 330.

According to an embodiment, the first switching circuit 310 may connect the first antenna ANT1 to the analog-to-digital converter 312 and the second antenna ANT2 to the digital-to-analog converter 380 in downlink communication.

According to another embodiment, the first switching circuit 310 may connect the first antenna ANT1 to the digital-to-analog converter 380 and the second antenna ANT2 to the analog-to-digital converter 312 in uplink communication.

A received signal Si received through the first antenna ANT1 may be input to the analog-to-digital converter 312 through the first switching circuit 310.

The analog-to-digital converter 312 may analog-to-digital convert the input received signal Si to output an analog-to-digital converted received signal Sx.

In the present specification, "digital signal" may broadly mean a digitized signal regardless of its shape, and may be a concept including a complex baseband digital signal.

The prefilter 314 may be an equivalent circuit indicating characteristics and delays of all filters until the received signal Si input through the first antenna of the repeater 300 is transmitted to the interference cancellation part 340.

A received signal Sd that has passed through the prefilter 314 may be input to a subtracter 350 of the interference cancellation part 340.

The synchronous detector 320 may detect a synchronization signal from a received signal, for example, the analog-to-digital converted received signal Sx.

A method for the synchronous detector 320 to detect a synchronization signal may be implemented in various ways.

According to an embodiment, the synchronous detector 320 may detect synchronization information by detecting at least one of a primary synchronization signal (PSS), a secondary synchronization signal (SSS), synchronization signal (SS)/physical broadcast channel (PBCH), a demodulation reference signal (DMRS), and a cyclic prefix (CP) from the received signal Sx.

The synchronous detector 320 may provide the detected synchronization information to the controller 330.

The controller 330 may determine a downlink communication period or an uplink communication period by using the synchronization information provided from the synchronous detector 320 and a received signal (e.g., the received signal Si transmitted from the first switching circuit 310).

The controller 330 may generate a control signal for controlling the first switching circuit 310, a digital signal processor 342, a second switching circuit 344, a plurality of adaptive filters 346-1 and 346-2, and a third switching circuit 348 according to a result of the determination.

Referring to FIG. 3 together, the controller 330 may include a frame boundary detector 332, a TDD pattern identifier 334, and a control signal generator 336.

The frame boundary detector 332 may detect a frame boundary based on synchronization information detected from the synchronous detector 320.

Referring to FIG. 4 together, the frame boundary detector 332 may detect a frame boundary (a starting point of the frame) in a received signal based on synchronization information (e.g., SYNC1) detected from the synchronous detector 320.

According to an embodiment, the frame boundary detector 332 may detect a frame boundary based on a constant correlation between the synchronization information (e.g., SYNC1) and the frame boundary.

The frame boundary detector 332 may transmit information about the detected frame boundary to the TDD pattern identifier 334.

The TDD pattern identifier 334 may obtain TDD pattern information from the information about the frame boundary transmitted from the frame boundary detector 332 and a received signal (e.g., Si transferred from the first switching circuit 310).

According to an embodiment, the TDD pattern identifier 334 may analyze and identify a TDD pattern of the received signal (e.g., Si) based on a power change of the received signal.

In the specification, a "TDD pattern" may be a pattern including timing information in which a downlink communication period and an uplink communication period are changed.

Referring to FIG. 4, the TDD pattern identifier 334 may determine the starting point of the frame through the information about the frame boundary, and may distinguish a first downlink communication period DL1, a first uplink communication period UL1, a second downlink communication period DL2, a second uplink communication period UL2, and the like according to the power change of the received signal (e.g., Si) from the starting point of the frame.

According to an embodiment, the TDD pattern identifier 334 may identify a TDD pattern by dividing a downlink period and an uplink period through various methods.

According to an embodiment, the TDD pattern identifier 334 may determine a period between a downlink communication period (e.g., DL1) and an uplink communication period (e.g., UL1) as a guard period (e.g., GP1), and may determine a period between an uplink communication period (e.g., UL1) and a downlink communication period (e.g., DL1) as an uplink-downlink transition gap (e.g., TG1). According to another embodiment, the TDD pattern identifier 334 may determine the opposite to the above.

Referring to FIG. 3, the control signal generator 336 may generate a control signal based on the information about the frame boundary output from the frame boundary detector 332 and the TDD pattern information output from the TDD pattern identifier 334.

According to an embodiment, the control signal generator 336 may separately generate a control signal corresponding to each of the first switching circuit 310, the digital signal processor 342, the second switching circuit 344, the plurality of adaptive filters 346-1 and 346-2, and the third switching circuit 348.

According to an embodiment, the control signal generator 336 may generate a control signal for switching a signal transmission path of each of the first switching circuit 310, the second switching circuit 344, and a third switching circuit 346 based on a detected synchronization signal.

According to an embodiment, the control signal generator 336 may generate a control signal (i.e., a selection signal) for selecting any one of the plurality of adaptive filters 346-1 and 346-2 based on a detected synchronization signal, and the plurality of adaptive filters 346-1 and 346-2 may selectively operate according to the control signal.

According to an embodiment, the control signal generator 336 may generate a control signal for controlling the digital signal processor 342 based on a detected synchronization signal.

Returning to FIG. 2, the interference cancellation part 340 may include the digital signal processor 342, the second switching circuit 344, the plurality of adaptive filters 346-1 and 346-2, the third switching circuit 348, and the subtracter 350.

The digital signal processor 342 may generate and output adaptive filter coefficients Wu or Wd to be used in the plurality of adaptive filters 346-1 and 346-2 by using an interference-cancelled communication signal Se and a delayed output signal Sf.

According to an embodiment, the digital signal processor 342 may generate, under the control of the controller 330, only the first adaptive filter coefficient Wu to be provided to the first adaptive filter 346-1 in an uplink communication period, and only the second adaptive filter coefficient Wd to be provided to the second adaptive filter 346-2 in a downlink communication period.

According to an embodiment, the first adaptive filter coefficient Wu may be set according to a feedback characteristic in the uplink communication period (e.g., the overall gain of an uplink communication path), and the second adaptive filter coefficient Wd may be set according to a feedback characteristic in the downlink communication period (e.g., the overall gain of a downlink communication path).

According to an embodiment, the first adaptive filter coefficient Wu and the second adaptive filter coefficient Wd may be coefficients having different values.

The second switching circuit 344 may selectively transmit the first adaptive filter coefficient Wu or the second adaptive filter coefficient Wd output from the digital signal processor 342 to the first adaptive filter 346-1 or the second adaptive filter 346-2 according to a switched path under the control of the controller 330.

The plurality of adaptive filters 346-1 and 346-2 may selectively operate in each of an uplink communication period or a downlink communication period under the control of the controller 330.

According to an embodiment, in the uplink communication period, the first adaptive filter 346-1 may operate to output a first predicted interference signal Yu, and in the downlink communication period, the second adaptive filter 346-2 may operate to output a second predicted interference signal Yd.

According to an embodiment, each of the plurality of adaptive filters 346-1 and 346-2 may be implemented as a finite impulse response (FIR) filter.

The third switching circuit 348 may select different signal paths in the uplink communication period or the downlink communication period under the control of the controller 330.

According to an embodiment, the third switching circuit 348 may transmit the first predicted interference signal Yu output from the first adaptive filter 346-1 to the subtracter 350 in the uplink communication period, and may transmit the second predicted interference signal Yd output from the second adaptive filter 346-2 to the subtracter 350 in the downlink communication period.

The subtracter 350 may output the interference-canceled communication signal Se by subtracting the first predicted interference signal Yu or the second predicted interference signal Yd from the received signal Sd that has passed through the prefilter 314.

According to an embodiment, the interference cancellation part 340 may be implemented with one processor 320. For example, the processor 320 may be implemented as a processor in the form of application specific integrated circuits (ASIC) or a field programmable gate array (FPGA).

The postfilter 360 may refer to an equivalent circuit showing characteristics and delays of all filters until a communication signal output after the interference cancellation part 340 is transmitted to the digital-to-analog converter 380.

An output signal So output from the postfilter 360 may be digital-to-analog converted by the digital-to-analog converter 380, and may be transmitted as a wireless communication signal (e.g., an RF signal) through the second antenna ANT2.

According to an embodiment, in an uplink communication period, the output signal So output from the postfilter 360 may be digital-to-analog converted by the digital-to-analog converter 380, and may be transmitted as a wireless communication signal (e.g., an RF signal) through the first antenna ANT1.

The output signal So output from the postfilter 360 may be delayed through the delay circuit 370 and output as the delayed output signal Sf. The delayed output signal Sf output from the delay circuit 370 may be input to the digital signal processor 342.

Figure 5:
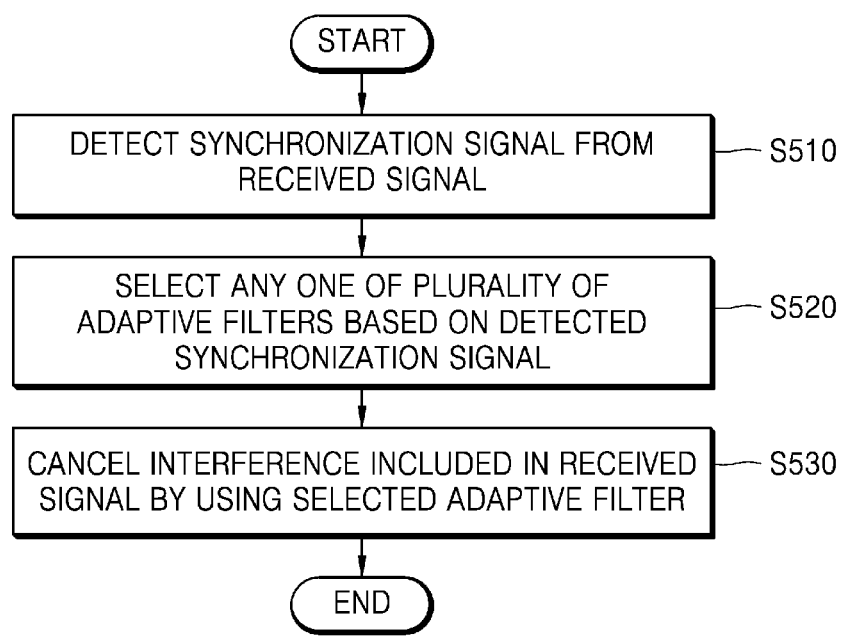
FIG. 5 is a flowchart illustrating a method of operating an interference cancellation repeater according to an embodiment.

FIG. 5 is a flowchart illustrating a method of operating an interference cancellation repeater according to an embodiment.

Referring to FIGS. 1 to 5, in operation S510, the interference cancellation repeater 300 according to an embodiment may detect a synchronization signal from a received signal.

According to an embodiment, the repeater 300 may detect a synchronization signal from a received signal, and may determine an uplink communication period and a downlink communication period according to the detected synchronization signal.

According to an embodiment, the repeater 300 may determine a guard period or an uplink-downlink transition gap period existing between the uplink communication period and the downlink communication period.

In operation S520, the repeater 300 may select any one of a plurality of adaptive filters based on the detected synchronization signal.

According to an embodiment, the repeater 300 may determine an uplink communication period and a downlink communication period based on the detected synchronization signal, and may select a first adaptive filter (e.g., 346-1) in the uplink communication period and select a second adaptive filter (e.g., 346-2) in the downlink communication period.

According to an embodiment, the repeater 300 may determine an uplink communication period and a downlink communication period based on the detected synchronization signal, and may provide the first adaptive filter coefficient Wu only to a first adaptive filter (e.g., 346-1) in the uplink communication period and provide the second adaptive filter coefficient Wd only to a second adaptive filter (e.g., 346-2) in the downlink communication period.

According to another embodiment, in a guard period (e.g., GP1 in FIG. 4), the repeater 300 may provide an adaptive filter coefficient used in a communication period (e.g., DL1) immediately before the guard period GP1.

In operation S530, the repeater 300 may cancel interference included in a received signal by using the selected adaptive filter.

According to an embodiment, the repeater 300 may cancel interference by subtracting a predicted interference signal (e.g., Yu or Yd) output from the selected adaptive filter (e.g., 346-1 or 346-2) from the received signal (e.g., Sd).

While the disclosure has been particularly shown and described with reference to embodiments thereof, it will be understood that various changes in form and details may be made therein without departing from the spirit and scope of the following claims.

The invention claimed is:

1. A method of operating an interference cancellation repeater, which shares a part of a downlink communication path and an uplink communication path, the method comprising:
   detecting a synchronization signal from a received signal;
   selecting one of a plurality of adaptive filters based on the detected synchronization signal; and
   canceling interference included in the received signal by using the selected adaptive filter,
   wherein an analog-to-digital converter and a digital-to-analog converter are included on a path shared by the downlink communication path and the uplink communication path,
   wherein the detecting of the synchronization signal comprises determining a downlink communication period or an uplink communication period based on the synchronization signal, and
   wherein the selecting one of the plurality of adaptive filters based on the detected synchronization signal comprises:
      selecting a first adaptive filter from among the plurality of adaptive filters in the uplink communication period, and
      selecting a second adaptive filter from among the plurality of adaptive filters in the downlink communication period.

2. The method of claim 1, wherein the interference cancellation repeater operates in a time division duplex (TDD) scheme.

3. The method of claim 1, further comprising:
   providing a first adaptive filter coefficient only to the first adaptive filter in the uplink communication period; and
   providing a second adaptive filter coefficient only to the second adaptive filter in the downlink communication period.

4. The method of claim 3, wherein the first adaptive filter coefficient and the second adaptive filter coefficient are coefficients having different values.

5. The method of claim 4, wherein the first adaptive filter coefficient is set according to a feedback characteristic in the uplink communication period, and
   wherein the second adaptive filter coefficient is set according to a feedback characteristic in the downlink communication period.

6. The method of claim 5, further comprising providing an adaptive filter coefficient used in a communication period immediately before the guard period from among the first adaptive filter coefficient and the second adaptive filter coefficient, in the guard period.

7. The method of claim 1, wherein the detecting of the synchronization signal comprises:
   detecting a frame boundary in the received signal based on the detected synchronization signal; and
   obtaining TDD pattern information from the received signal, and
   the selecting one of the plurality of adaptive filters based on the detected synchronization signal comprises selecting any one of the plurality of adaptive filters based on the frame boundary and the TDD pattern information.

8. An interference cancellation repeater, which shares a part of a downlink communication path and an uplink communication path, the interference cancellation repeater comprising:
   a synchronous detector configured to detect a synchronization signal from a received signal;
   a plurality of adaptive filters, each of which generates a predicted interference signal for canceling interference included in the received signal in an uplink communication period or a downlink communication period;
   a controller configured to generate a selection signal for selecting one of the plurality of adaptive filters based on the detected synchronization signal; and
   wherein the plurality of adaptive filters selectively operate in each of an uplink communication period or a downlink communication period,
   wherein an analog-to-digital converter and a digital-to-analog converter are included on a path shared by the downlink communication path and the uplink communication path, and
   wherein the controller is configured to:
      determine a downlink communication period or an uplink communication period based on the synchronization signal,
      select a first adaptive filter from among the plurality of adaptive filters in the uplink communication period, and
      select a second adaptive filter from among the plurality of adaptive filters in the downlink communication period.

* * * * *